United States Patent
Chan et al.

(10) Patent No.: US 10,528,067 B2
(45) Date of Patent: Jan. 7, 2020

(54) INTERFACE DEVICE AND INTERFACE TEMPERATURE MONITORING DEVICE

(71) Applicant: RICHTEK TECHNOLOGY CORPORATION, Zhubei, Hsinchu (TW)

(72) Inventors: Chen-Hui Chan, Taipei (TW); Wei-Hsu Chang, Hsinchu (TW); Ta-Yung Yang, Taoyuan (TW)

(73) Assignee: RICHTEK TECHNOLOGY CORPORATION, Zhubei, Hsinchu (TW)

( * ) Notice: Subject to any disclaimer, the term of this patent is extended or adjusted under 35 U.S.C. 154(b) by 124 days.

(21) Appl. No.: 15/925,589

(22) Filed: Mar. 19, 2018

(65) Prior Publication Data

US 2018/0307256 A1    Oct. 25, 2018

Related U.S. Application Data

(60) Provisional application No. 62/488,395, filed on Apr. 21, 2017.

(30) Foreign Application Priority Data

Jan. 12, 2018 (TW) .............................. 107101136 A (51) Int. Cl.
G05D 23/24 (2006.01)
H01C 7/04 (2006.01)
G01K 7/25 (2006.01)
H02H 7/085 (2006.01)

(52) U.S. Cl.
CPC ............... G05D 23/24 (2013.01); G01K 7/25 (2013.01); H01C 7/04 (2013.01); *H02H 7/0852* (2013.01)

(58) Field of Classification Search
CPC . G05D 23/24; G01K 7/25; H01C 7/04; H02H 7/0852
See application file for complete search history.

(56) References Cited

U.S. PATENT DOCUMENTS

8,878,497 B2    11/2014 Ohkuma

*Primary Examiner* — Robert L Deberadinis
(74) *Attorney, Agent, or Firm* — Tung & Associates (57) ABSTRACT

An interface device includes: at least one configuration channel terminal for communicating configuration information, wherein whether the interface device itself is in connection and whether the interface device itself is at a high voltage side or a low voltage side are determined according to a voltage or current status at the configuration channel terminal; a multi-functional transmission line, which includes a thermistor; and a temperature monitor circuit, coupled to the multi-functional transmission line, for sensing a temperature status to generate a temperature sensing signal. When two interface devices are connected with each other, the thermistor and the temperature monitor circuit can be located together in one of the interface devices or separately located in different interface devices.

19 Claims, 10 Drawing Sheets

INTERFACE DEVICE AND INTERFACE TEMPERATURE MONITORING DEVICE

CROSS REFERENCE

The present invention claims priority to U.S. 62/488,395, filed on Apr. 21, 2017, and TW 107101136, filed on Jan. 12, 2018.

BACKGROUND OF THE INVENTION

Field of Invention

The present invention relates to an interface device and an interface temperature monitoring device. More particularly, the present invention relates to an interface device and an interface temperature monitoring device which is able to deliver a temperature sensing signal through a configuration channel terminal and adjust the power source in accordance with the temperature sensing signal.

Description of Related Art

Figure 1:
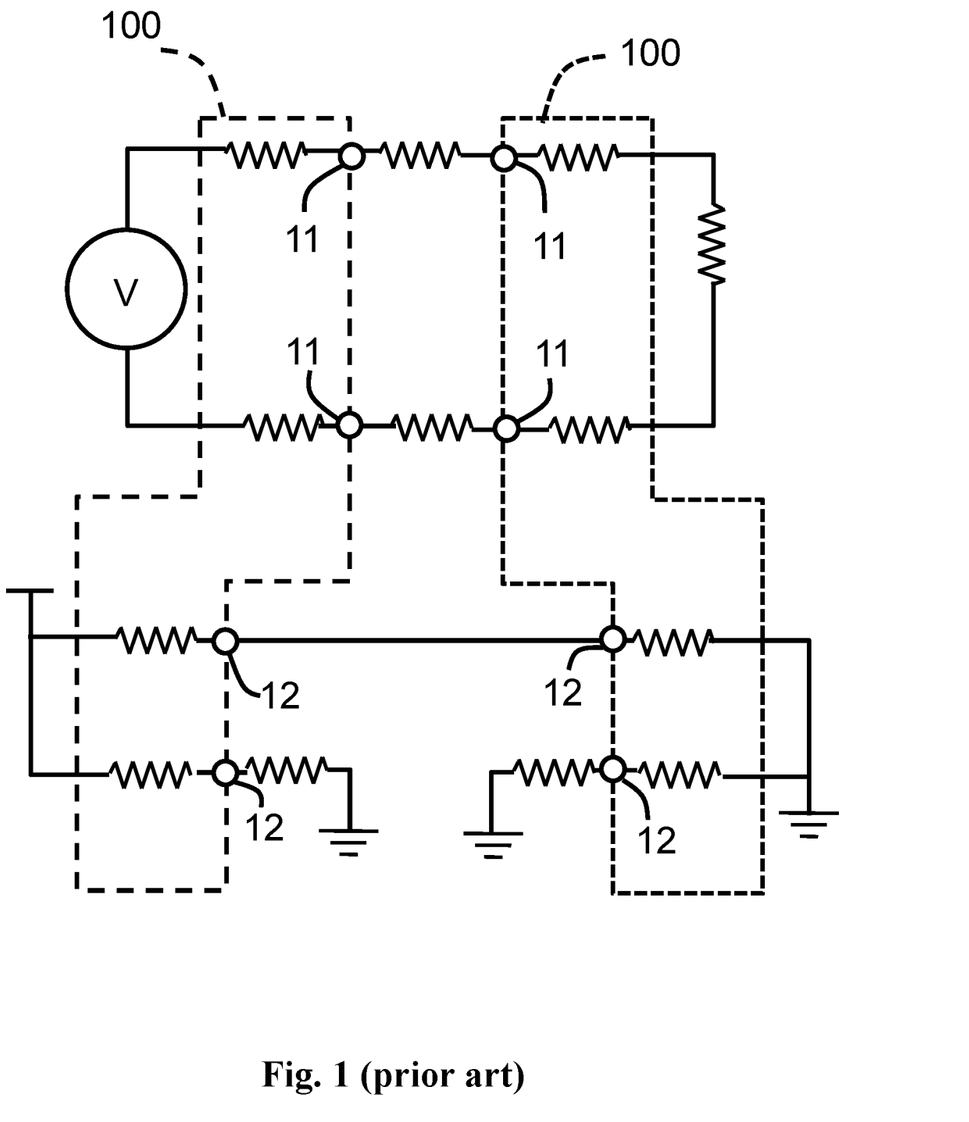
FIG. 1 shows a schematic view of a conventional USB Type-C interface device.

An USB Type-C compliant interface device may provide high voltage (e.g. 20V) or high current (e.g. 5A). FIG. 1 is a schematic view of two conventional USB Type-C interface devices 100 connected to each other. The USB Type-C interface device 100 includes at least one power source terminal 11 and at least one configuration channel terminal 12. Whether the interface device is in connection and whether the interface device is at a high voltage side or a low voltage side are determined according to a voltage or current status at the configuration channel terminal 12. This prior art has drawbacks that: because the specification allows high voltage and high current, the heat caused by the high voltage and the high current is more likely to damage the lines than an interface device of low voltage and low current. Further, the terminals may have high resistance to generate heat, when connecting to corresponding terminals of another electronic device or interface device. Besides, the housing of the interface device may conduct heat and thus hurt a user. Hence, it is desired to provide a solution which solves the problems caused by high temperature in the prior art.

SUMMARY OF THE INVENTION

From one perspective, the present invention provides an interface device, which includes: at least one power source terminal for delivering power; at least one configuration channel terminal for communicating configuration information, wherein whether the interface device is in connection and whether the interface device is at a high voltage side or a low voltage side are determined according to a voltage or current status at the configuration channel terminal; a multi-functional transmission line coupled to the at least one configuration channel terminal, the multi-functional transmission line including a temperature sensor; and a temperature monitor circuit coupled to the multi-functional transmission line for sensing a temperature status to generate a temperature sensing signal.

In one embodiment, the temperature sensor includes a resistor whose resistance is a function of temperature.

In one embodiment, the temperature sensor includes a thermistor.

In one embodiment, the thermistor is a Thermistor with Positive Temperature Coefficient (PTC thermistor) or a Thermistor with Negative Temperature Coefficient (NTC thermistor).

In one embodiment, the multi-functional transmission line is coupled to a positive potential, and the multi-functional transmission line further includes a first resistor, the first resistor and the thermistor being coupled in series between the positive potential and the configuration channel terminal.

In one embodiment, the temperature monitor circuit generates the temperature sensing signal according to a voltage at the configuration channel terminal or a voltage at a node between the first resistor and the thermistor.

In one embodiment, the multi-functional transmission line is coupled to a positive potential, and the multi-functional transmission line further includes a first resistor, the first resistor and the thermistor being coupled in parallel between the positive potential and the configuration channel terminal.

In one embodiment, the temperature monitor circuit generates the temperature sensing signal according to a voltage at the configuration channel terminal.

In one embodiment, the multi-functional transmission line is coupled to a positive potential, and the multi-functional transmission line further includes a current source coupled between the positive potential and the thermistor, the thermistor being coupled between the current source and the configuration channel terminal.

In one embodiment, the temperature monitor circuit generates the temperature sensing signal according to a voltage at the configuration channel terminal or a voltage at a node between the current source and the thermistor.

In one embodiment, the temperature monitor circuit includes an analog to digital converter (ADC) or a comparator circuit.

In one embodiment, the interface device is compliant with the specification of USB Type-C.

From another perspective, the present invention provides a first interface device at a high voltage side and a second interface device at a low voltage connected with each other directly or indirectly; wherein the first interface device includes: at least one first configuration channel terminal for communicating configuration information; and a first multi-functional transmission line coupled to the at least one first configuration channel terminal, the first multi-functional transmission line being coupled to a positive potential; wherein the second interface device includes: at least one second configuration channel terminal for communicating configuration information; and a second multi-functional transmission line coupled to the at least one second configuration channel terminal, the second multi-functional transmission line being coupled to a ground potential; wherein, each interface device is configured to determine whether the interface device itself is in connection and whether the interface device itself is at a high voltage side or a low voltage side according to a voltage or current status at the corresponding configuration channel terminal; wherein the first multi-functional transmission line is coupled to the second multi-functional transmission line; and wherein the interface temperature monitoring device further includes: a temperature sensor connected within the first or the second multi-functional transmission line, and a temperature monitor circuit located in the first interface device and coupled to the first multi-functional transmission line or located in the second interface device and coupled to the second multi-functional transmission line, for sensing a temperature status to generate a temperature sensing signal.

In one embodiment, the temperature sensor is located in a receptacle of the first or the second interface device.

The objectives, technical details, features, and effects of the present invention will be better understood with regard to the detailed description of the embodiments below.

DESCRIPTION OF THE PREFERRED EMBODIMENTS

The drawings as referred to throughout the description of the present invention are for illustration only, to show the interrelations between the circuits and the signal waveforms, but not drawn according to actual scale.

Figure 2:
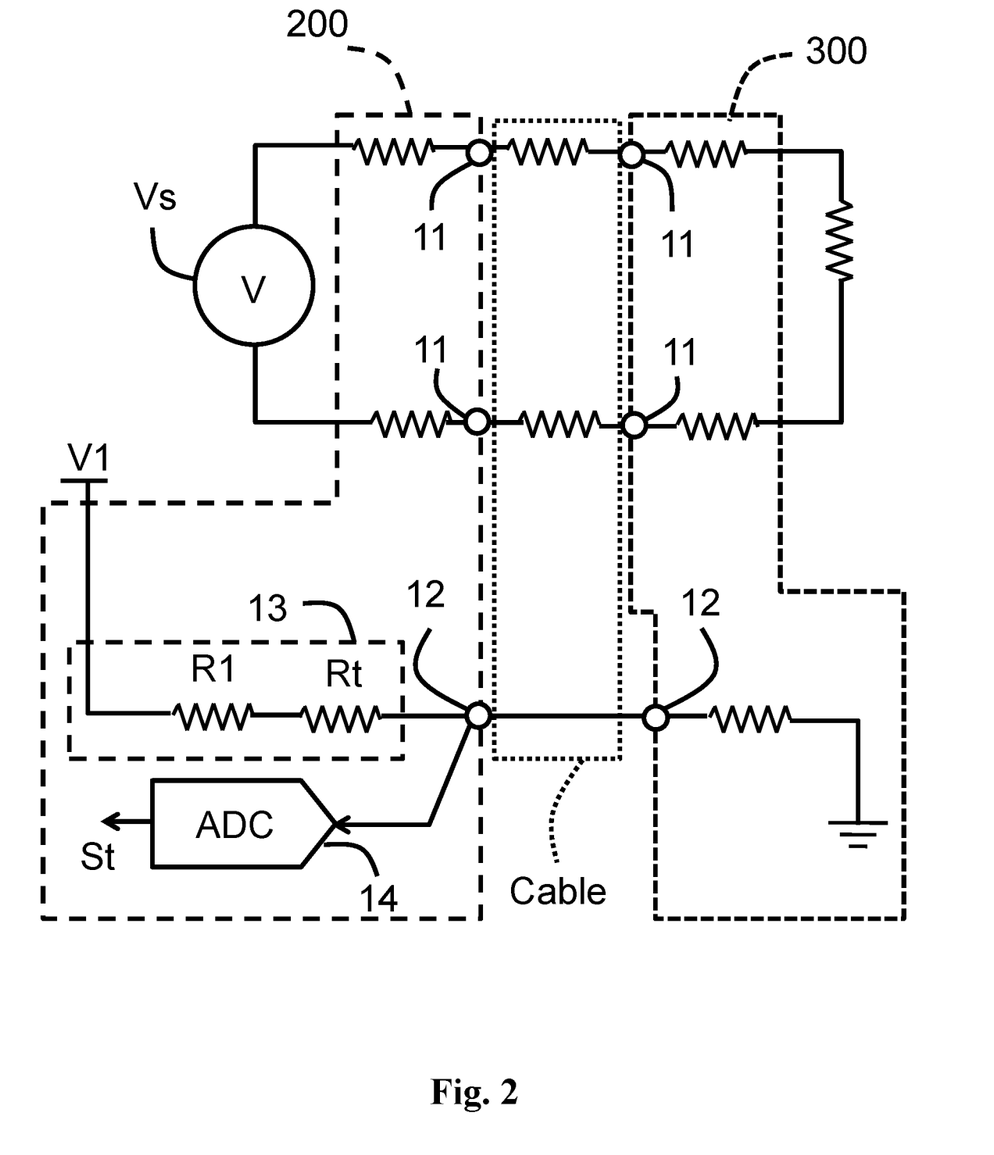
FIGS. 2-10 respectively shows schematic views of interface devices according to several embodiments of the present invention.

Referring to FIG. 2, an interface device 200 according to one embodiment of the present invention is shown, which may be, but not limited to, a USB Type-C compliant interface device. The interface device 200 includes: at least one power source terminal 11 for delivering power (e.g. delivering power from the power source Vs to another interface device 300 as shown); at least one configuration channel terminal 12 for communicating configuration information, wherein whether the interface device is in connection and whether the interface device is at a high voltage side or a low voltage side are determined according to a voltage or current status at the configuration channel terminal 12; a multi-functional transmission line 13 coupled to the configuration channel terminal 12; and a temperature monitor circuit 14 coupled to the multi-functional transmission line 13 for sensing a temperature status, wherein the configuration channel terminal 12 and the multi-functional transmission line 13 have a configuration communicating function and a temperature sensing function; in the configuration communicating function, the present connection status of the interface device 200 may be determined, and in the temperature sensing function, a temperature sensing signal St may be generated by the multi-functional transmission line 13 through the temperature monitor circuit 14. In the embodiment shown in FIG. 2, the temperature monitor circuit 14 is an analogue to digital converter (ADC, which converts the voltage at the configuration channel terminal 12 into the digital temperature sensing signal St; however, the temperature monitor circuit 14 is not limited to an ADC and may be embodied by a different kind of circuit. When the temperature sensing signal St indicates an overheat status, for example, the voltage or the current of the power source, or both the voltage and the current of the power source, may be adjusted.

In the embodiment aforesaid, when the configuration channel terminal 12 and the multi-functional transmission line 13 are under the configuration communicating function, the multi-functional transmission line 13 may be used in communicating configuration channel signals (i.e. configuration information); the configuration information may be defined according to the specification of the interface device. When the configuration channel terminal 12 and the multi-functional transmission line 13 are under the temperature sensing function, the multi-functional transmission line 13 may be used in generating the temperature sensing signal St. The configuration communicating function and the temperature sensing function may be performed concurrently or non-concurrently.

The multi-functional transmission line 13 includes a temperature sensor. In one embodiment, temperature sensor includes a resistor whose resistance is a function of temperature. In the shown example, the temperature sensor is a thermistor Rt. When the temperature varies, the resistance of the thermistor Rt varies correspondingly. The voltage across the thermistor Rt as well as the voltage at the configuration channel terminal 12 varies as the resistance varies, and such variation is reflected on the sensing signal St. In one embodiment, the interface device 200 may include a receptacle and the temperature sensor for example can be located in the receptacle.

The thermistor can be a Thermistor with Positive Temperature Coefficient (PTC Thermistor) or a Thermistor with Negative Temperature Coefficient (NTC Thermistor); both can generate voltage variation according to temperature variation, so as to sense temperature. thereby.

When the interface device 200 is at the high voltage side under a connection status, the multi-functional transmission line 13 is coupled to a proper positive potential V1. For transmitting the configuration information, the multi-functional transmission line 13 may include a first resistor R1 which is coupled with the thermistor Rt in series or in parallel (see FIGS. 2, 3, 6), or may include a current source Is through which is coupled to the positive potential V1 (see FIGS. 4, 5, 7, 8, 9, 10); these embodiments are all within the scope of the present invention. Note that, in the embodiment wherein the first resistor R1 is connected in series with the thermistor Rt, their positions can be interchanged.

In the embodiment as shown in FIG. 2, the interface device 200 has two power source terminals 11, while this is only an embodiment for illustration. According to the present invention, depending on different demands, there may be one or more than two power source terminals. Both of the configuration channel terminal 12 and the power source terminals 11 are part of the structure of the interface device 200, so the temperature sensing signal St generated by the multi-functional transmission line 13 through the temperature monitor circuit 14 can reflect the temperature status of the interface device 200 affected by the delivered power.

Still referring to FIG. 2, the interface device 200 may be connected to another interface device 300 through a cable. This interface device 300, based on different demands, may have the same specification as the interface device 200 (e.g. the configuration channel terminal 12 of the interface device 300 can provide both the configuration communication function and the temperature monitor function), or the interface device 300 may be different from the interface device 200. Besides, although the interface device 200 and the interface device 300 are connected to each other through a cable, according to the present invention, the interface device 200 and the interface device 300 may be connected to each other directly, which will be explained in detail later with reference to another embodiment.

Figure 3:
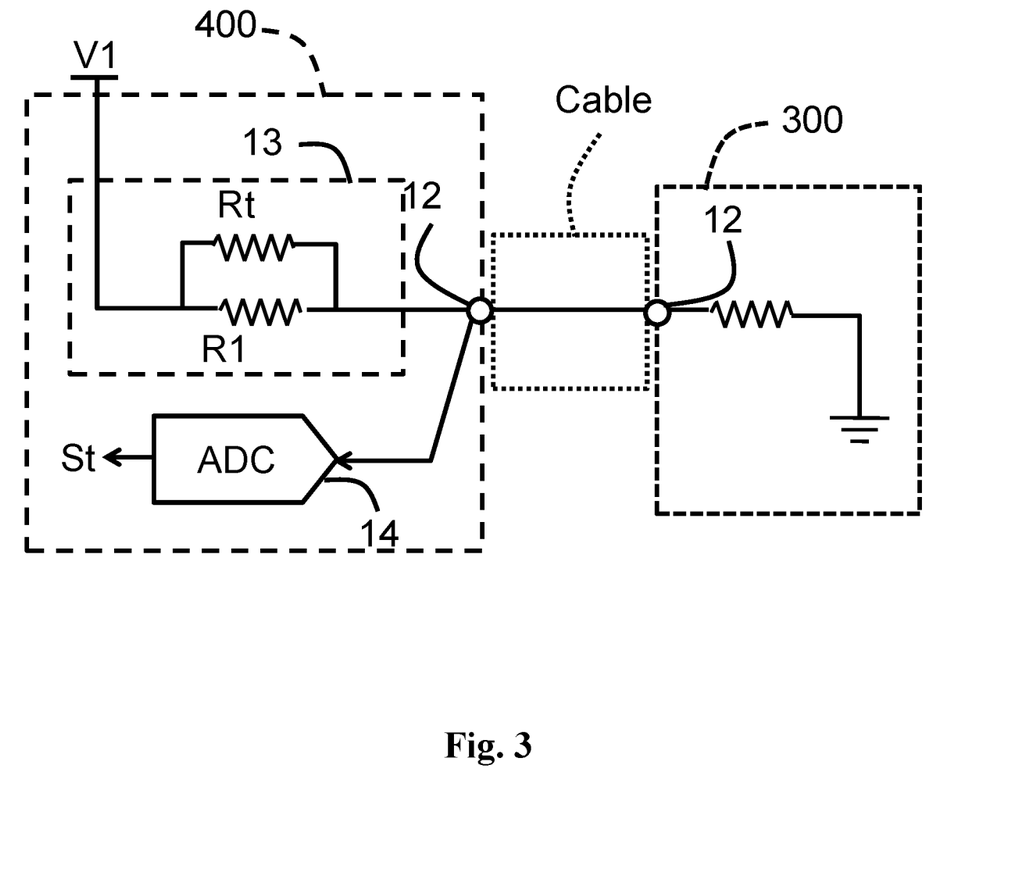

In another embodiment, referring to FIG. 3, in the multi-functional transmission line 13 of an interface device 400, the first resistor R1 and the thermistor Rt are coupled in parallel between the positive potential V1 and the configuration channel terminal 12. In this embodiment, the variation of the resistance of the thermistor Rt also changes the voltage at the configuration channel terminal 12, and the variation can be reflected on the sensing signal St. To simplify the figures, the power source terminals are omitted in this and the follow-up embodiments and not shown in the figures.

The multi-functional transmission line 13 of the present invention is not limited to being coupled to the positive potential V1 via the first resistor R1; For example, in the interface device 500 shown in FIG. 4, the multi-functional transmission line 13 is coupled to the positive potential V1 via a current source Is, wherein the thermistor Rt is coupled to a node N1 between the configuration channel terminal 12 and the current source Is. When the resistance of the thermistor Rt varies, the voltage at node N1 varies correspondingly, which is reflected on the sensing signal St.

The temperature monitor circuit 14 is not limited to an ADC. In the interface device 600 shown in FIG. 5, the temperature monitor circuit 14 is embodied as a comparator circuit; an input of the comparator circuit receives the voltage at the node N1, and another input thereof receives a reference voltage Vref. The reference voltage Vref for example corresponds to a threshold temperature; when the sensed voltage at the node N1 is higher than the reference voltage Vref, it indicates that the current temperature is higher or lower than the threshold temperature (depending on whether a PTC Thermistor or the NTC Thermistor is used, and how the positive and negative inputs of the comparator circuit are connected). Hence, the output of the comparator circuit can be used as the temperature sensing signal St to indicate the present temperature status.

It is not limited to connecting an input of the comparator circuit to the node N1 when using the comparator circuit as the temperature monitor circuit 14; in every embodiment which uses the analogue to digital converter (ADC), the ADC may be substituted with a comparator circuit, and what is connected to the input of the ADC may instead be connected to one input of the comparator circuit, to be compared with the reference voltage Vref which is connected to the other input of the comparator circuit.

Besides, it is not limited to using only one comparator circuit to be the temperature monitor circuit 14. For example, two or more comparator circuits may be used to compare a sensed voltage with two or more reference voltages. When one comparator circuit is used, it may be regarded as generating a one-bit temperature sensing signal St; when multiple comparator circuits are used, it may be regarded as generating a multi-bit temperature sensing signal St.

Figure 6:
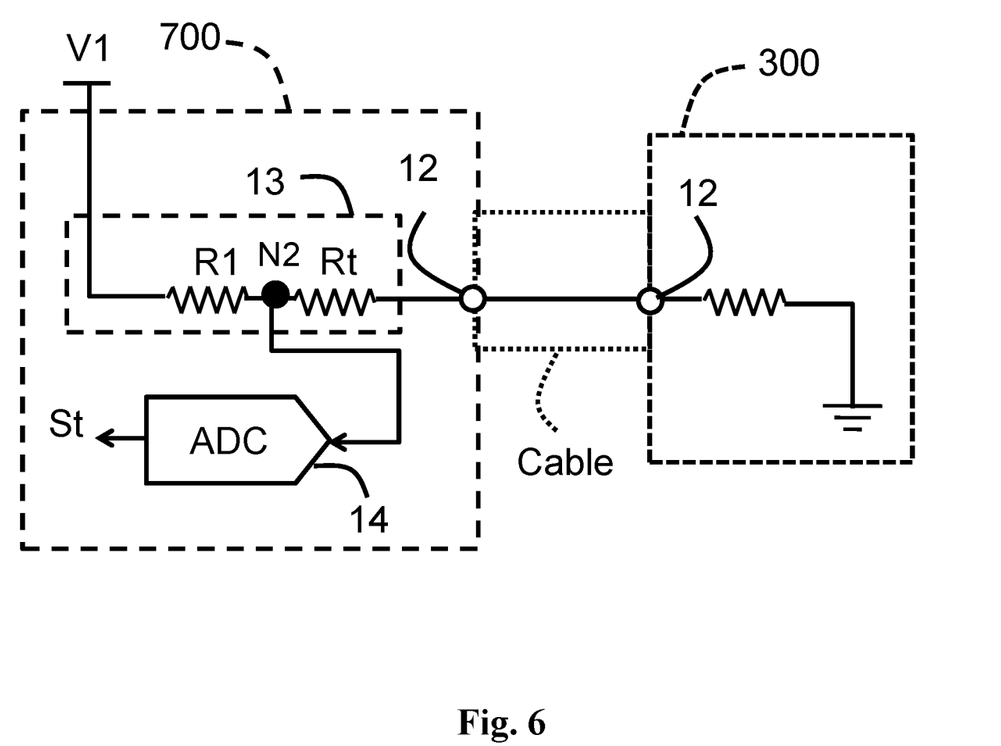

FIG. 6 shows an interface device 700 in accordance with one embodiment of the present invention, wherein the temperature monitor circuit 14 fetches signals from a node N2 between the thermistor Rt and the first resistor R1 to sense the variation of temperature, and generates temperature sensing signal St thereby. As described above, the temperature monitor circuit 14 which is shown as an ADC may be substituted with a comparator circuit to generate the temperature sensing signal St. In this embodiment, the variation of resistance of the thermistor Rt is also reflected on the sensing signal St.

Figure 7:
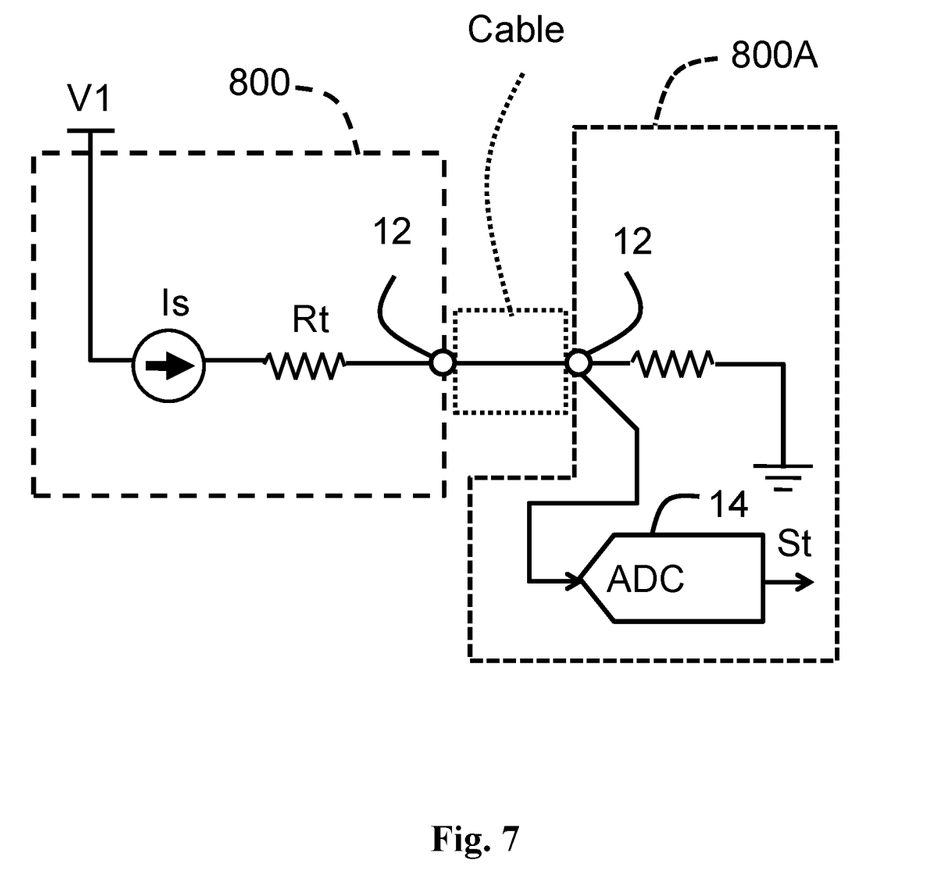

FIG. 7 shows another embodiment according to the present invention, wherein the configuration channel terminal of the interface device 800 is connected to another configuration channel terminal 12 of another interface device 800A. In this embodiment, the thermistor is located within the interface device 800 and the temperature monitor circuit 14 is located within the interface device 800A, wherein the interface device 800 is at the high voltage side of the configuration channel and the interface device 800A is at the low voltage side of the configuration channel.

Figure 8:
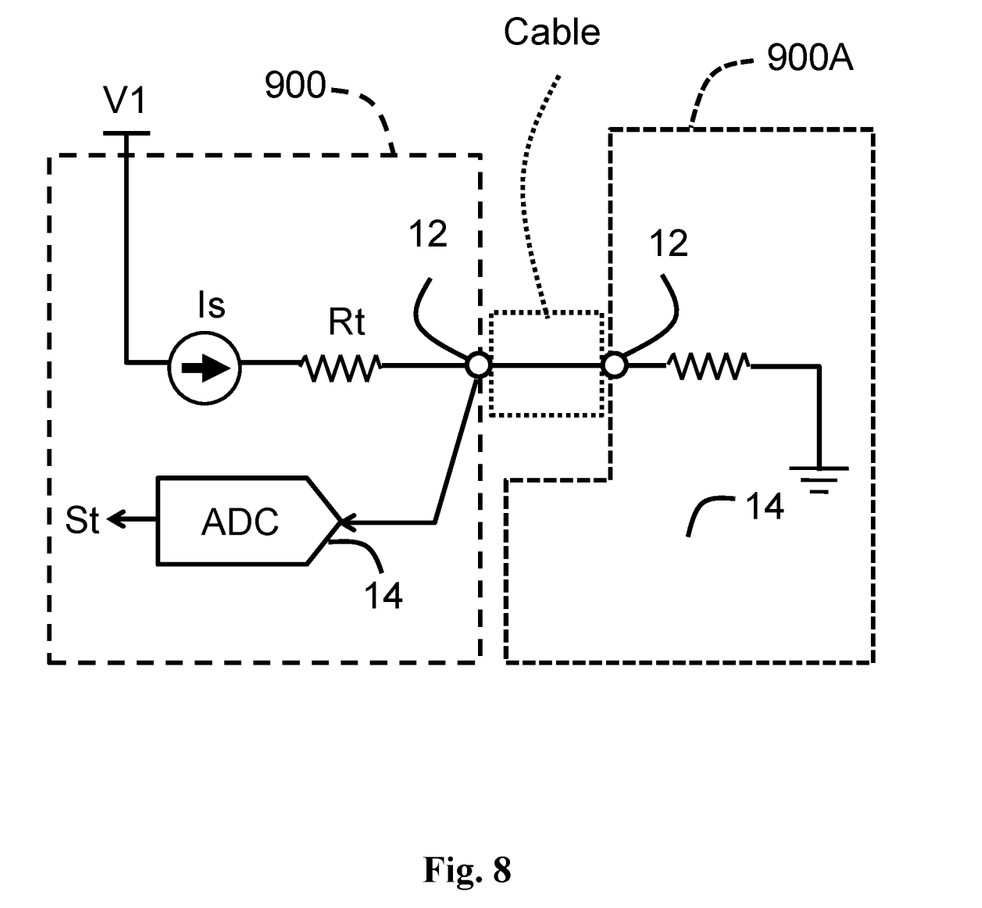

FIG. 8 shows yet another embodiment according to the present invention, wherein the configuration channel terminal of the interface device 900 is connected to another configuration channel terminal 12 of another interface device 900A. In this embodiment, the thermistor Rt is located within the interface device 900A and the temperature monitor circuit 14 is located within the interface device 900, wherein the interface device 900 is at the high voltage side of the configuration channel and the interface device 900A is at the low voltage side of the configuration channel.

Figure 9:
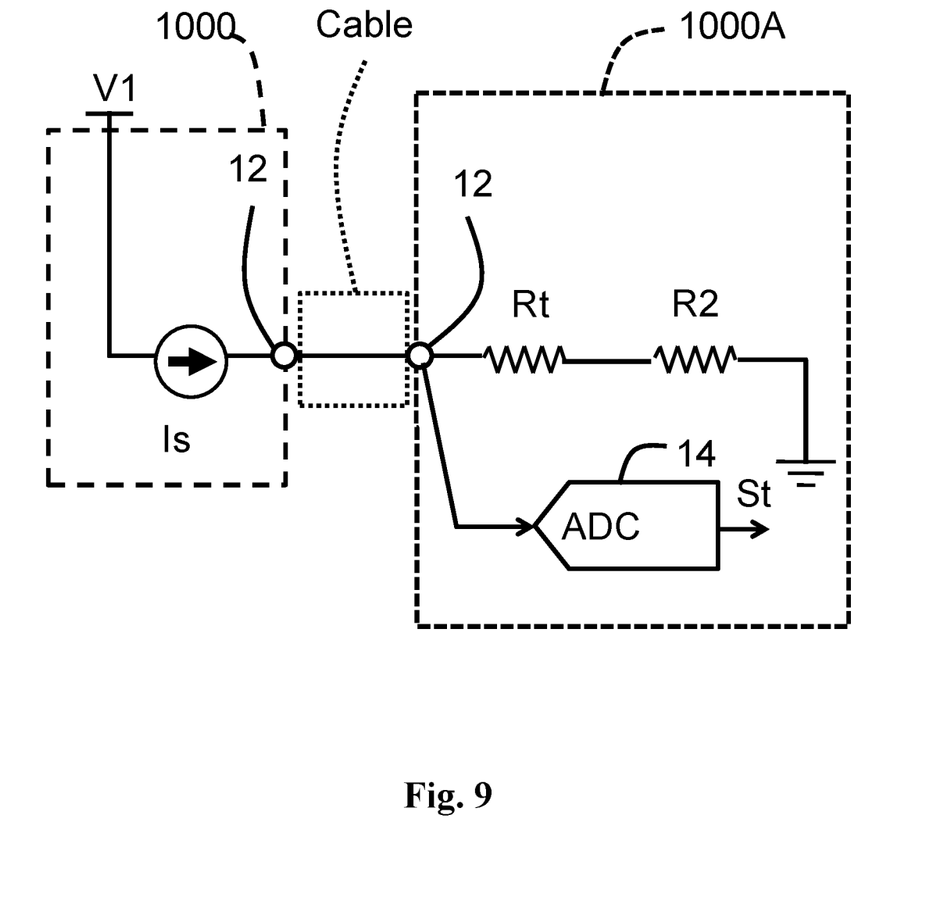
Figure 10:
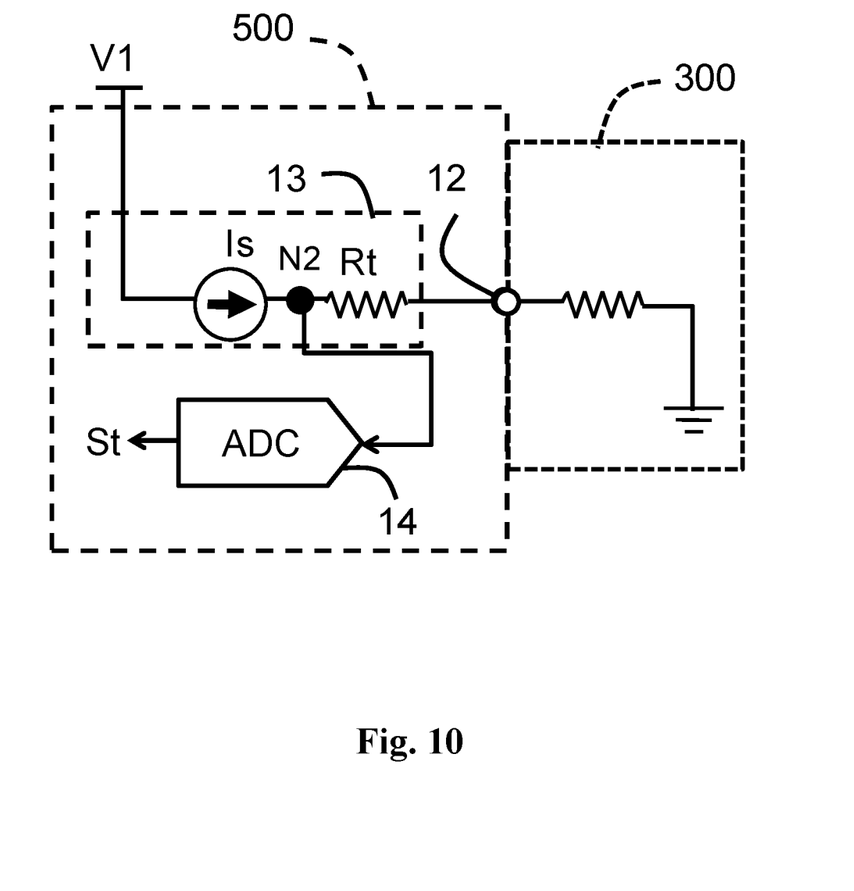

FIG. 9 shows still another embodiment according to the present invention, wherein the configuration channel terminal 12 of the interface device 1000 is connected to another configuration channel terminal 12 of the interface device 1000A. In this embodiment, both of the thermistor Rt and the temperature monitor circuit 14 are located within the interface device 1000A, wherein the interface device 1000 is at the high voltage side of the configuration channel and the interface device 1000A is at the low voltage side of the configuration channel.

In the above embodiments shown in FIGS. 7-9, the temperature monitor circuit 14 also can generate sensing signals St to reflect the status of the temperature; besides, the analogue to digital converter ADC may be substituted with a comparator circuit, and the current source Is may be substituted with the first resistor R1. The embodiment shown in FIG. 8 can be modified such that the temperature monitor circuit 14 fetches signals from the node between the thermistor Rt and the current source Is. The embodiment shown in FIG. 9 can be modified such that the temperature monitor circuit 14 fetches signals from the node between the thermistor Rt and the second resistor R2.

In the above three embodiments, the multi-functional transmission line of the interface devices 800A-900A-1000A at the low voltage side are coupled to ground.

According to the present invention, two interface devices may be directly connected with each other without a cable in between. Please refer to FIG. 10, which shows an embodiment that is similar to the embodiment shown in FIG. 4, but there is no cable between two interface devices 500 and 300; the terminals of the two interface devices 500 and 300 are connected to each other directly. In this embodiment, the temperature monitor signal is generated in a similar way to the embodiment shown in FIG. 4.

Figure 4:
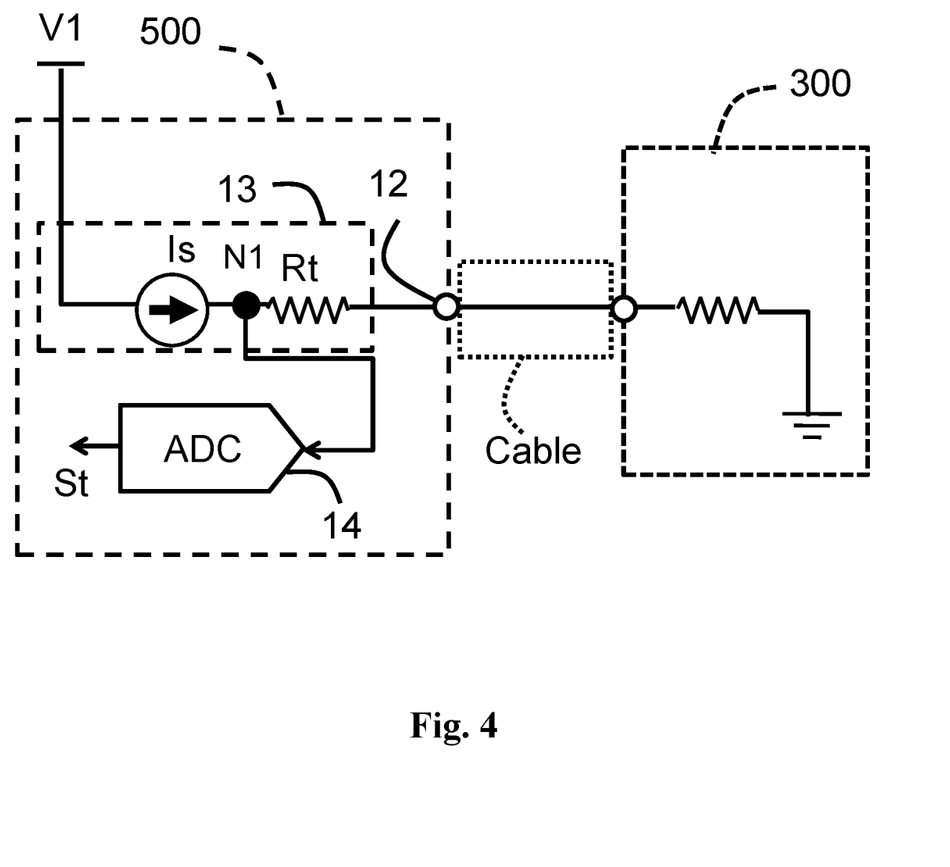
Figure 5:
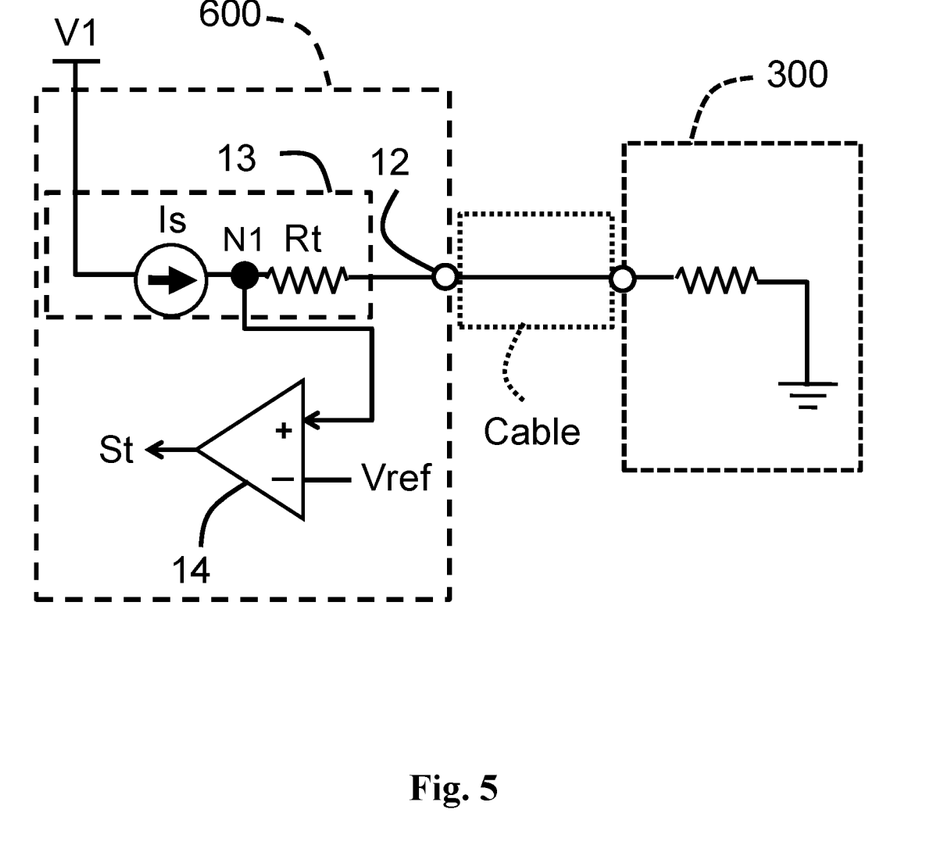

In addition to the embodiment illustrated in FIG. 4, the two interface devices shown in FIGS. 2, 3, 5, 7, 8, 9 may also be connected directly without using a cable in between.

The present invention has been described in considerable detail with reference to certain preferred embodiments thereof. It should be understood that the description is for illustrative purpose, not for limiting the scope of the present invention. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. Furthermore, those skilled in this art can readily conceive variations and modifications within the spirit of the present invention. For example, between two circuits or elements connect directly shown in each embodiment, one may insert other circuits or elements which do not affect the primary function of the whole circuitry, such as a switch, a buffer, etc., and thus the term "couple" should include direct and indirect connection. The definition of high and low levels of a comparator circuit may be interchanged, with corresponding modifications to circuits that process these signals. The temperature monitor circuit is not limited to being realized by an analogue to digital converter or a comparator circuit with two inputs; other circuits may be used instead. For instance, a Smith Trigger or an inverter may be utilized; a Smith Trigger or an inverter may be regarded as a single-input comparator circuit, which compares the input with a built-in threshold value. Such and other modifications can be conceived under the teachings of the present invention, and should be regarded as falling within the scope of the present invention.

What is claimed is:

1. An interface device, including:
   at least one power source terminal for delivering power;
   at least one configuration channel terminal for communicating configuration information, wherein whether the interface device is in connection and whether the interface device is at a high voltage side or a low voltage side are determined according to a voltage or current status at the configuration channel terminal;
   a multi-functional transmission line coupled to the at least one configuration channel terminal, the multi-functional transmission line including a temperature sensor; and
   a temperature monitor circuit coupled to the multi-functional transmission line for sensing a temperature status to generate a temperature sensing signal.

2. The interface device of claim 1, wherein the temperature sensor includes a thermistor.

3. The interface device of claim 2, wherein the thermistor is a thermistor with Positive Temperature Coefficient (PTC thermistor) or a thermistor with Negative Temperature Coefficient (NTC thermistor).

4. The interface device of claim 2, wherein the multi-functional transmission line is coupled to a positive potential, and the multi-functional transmission line further includes a first resistor, the first resistor and the thermistor being coupled in series between the positive potential and the configuration channel terminal.

5. The interface device of claim 4, wherein the temperature monitor circuit generates the temperature sensing signal according to a voltage at the configuration channel terminal or a voltage at a node between the first resistor and the thermistor.

6. The interface device of claim 2, wherein the multi-functional transmission line is coupled to a positive potential, and the multi-functional transmission line further includes a first resistor, the first resistor and the thermistor being coupled in parallel between the positive potential and the configuration channel terminal.

7. The interface device of claim 6, wherein the temperature monitor circuit generates the temperature sensing signal according to a voltage at the configuration channel terminal.

8. The interface device of claim 2, wherein the multi-functional transmission line is coupled to a positive potential, and the multi-functional transmission line further includes a current source coupled between the positive potential and the thermistor, the thermistor being coupled between the current source and the configuration channel terminal.

9. The interface device of claim 8, wherein the temperature monitor circuit generates the temperature sensing signal according to a voltage at the configuration channel terminal or a voltage at a node between the current source and the thermistor.

10. The interface device of claim 2, wherein the temperature monitor circuit includes an analog to digital converter (ADC) or a comparator circuit.

11. The interface device of claim 1, wherein temperature sensor includes a resistor whose resistance is a function of temperature.

12. The interface device of claim 11, wherein the temperature monitor circuit includes an analog to digital converter (ADC) or a comparator circuit.

13. The interface device of claim 1, wherein the interface device is compliant with the specification of USB Type-C.

14. The interface device of claim 1, wherein the temperature monitor circuit includes an analog to digital converter (ADC) or a comparator circuit.

15. The interface temperature sensing device of claim 14, wherein the temperature monitor circuit includes an analog to digital converter (ADC) or a comparator circuit.

16. The interface device of claim 1, further comprising a receptacle, wherein the temperature sensor is located in the receptacle of the interface device.

17. The interface temperature sensing device of claim 16, wherein the temperature sensor includes a resistor whose resistance is a function of temperature.

18. The interface temperature sensing device of claim 16, wherein the temperature sensor is located in a receptacle of the first or the second interface device.

19. An interface temperature monitoring device, comprising:
   a first interface device at a high voltage side and a second interface device at a low voltage connected with each other directly or indirectly;
   wherein the first interface device includes:
   at least one first configuration channel terminal for communicating configuration information; and
   a first multi-functional transmission line coupled to the at least one first configuration channel terminal, the first multi-functional transmission line being coupled to a positive potential;
   wherein the second interface device includes:
   at least one second configuration channel terminal for communicating configuration information; and
   a second multi-functional transmission line coupled to the at least one second configuration channel terminal, the second multi-functional transmission line being coupled to a ground potential;
   wherein each interface device is configured to determine whether the interface device itself is in connection and whether the interface device itself is at a high voltage side or a low voltage side according to a voltage or current status at the corresponding configuration channel terminal;
   wherein the first multi-functional transmission line is coupled to the second multi-functional transmission line; and
   wherein the interface temperature monitoring device further includes:
   a temperature sensor connected within the first or the second multi-functional transmission line, and
   a temperature monitor circuit located in the first interface device and coupled to the first multi-functional transmission line or located in the second interface device and coupled to the second multi-functional transmission line, for sensing a temperature status to generate a temperature sensing signal.

* * * * *